United States Patent [19]

Wood

[11] Patent Number: 4,577,388
[45] Date of Patent: Mar. 25, 1986

[54] METHOD OF CUTTING APERTURES IN LINING IN UNDERGROUND PIPES

[75] Inventor: Eric Wood, Willingborough, England

[73] Assignee: Insituform Intl Inc, Channel Islands

[21] Appl. No.: 669,780

[22] Filed: Nov. 9, 1984

Related U.S. Application Data

[63] Continuation of Ser. No. 346,866, Feb. 8, 1982, abandoned.

[30] Foreign Application Priority Data

Feb. 6, 1981 [GB] United Kingdom ............... 8103660

[51] Int. Cl.$^4$ ..................... B23P 17/00; B23C 3/02; E03F 3/06
[52] U.S. Cl. ..................................... 29/558; 166/55; 409/132; 409/143
[58] Field of Search ............... 29/566, 557, 558; 409/143, 132, 131; 166/55, 56, 55.2; 299/1, 39; 138/97; 175/77, 78

[56] References Cited

U.S. PATENT DOCUMENTS 4,197,908  4/1980  Davis et al. .................. 409/143 X
4,442,891  4/1984  Wood ............................ 409/143 X Primary Examiner—William R. Briggs
Attorney, Agent, or Firm—Fred Philpitt

[57] ABSTRACT

A method for re-establishing side connections to an underground pipe after the same has been lined with a rigid lining of synthetic resin is disclosed, and in the method a cutter of the unit located in the pipeline moves in accordance with a pre-programmed contour which matches the contour of the side connection, thereby effectively and quickly to re-establish the side connection.

The pre-programmed arrangement may be generated by sensing the side connection profile prior to the lining operation.

2 Claims, 7 Drawing Figures

METHOD OF CUTTING APERTURES IN LINING IN UNDERGROUND PIPES

This is a continuation of application Ser. No. 346,866, filed Feb. 8, 1982, abandoned, and the benefits of 35 USC 120 are claimed relative to it.

This invention relates to a method of and apparatus for the cutting of apertures in lining in underground pipes, and in particular is concerned with the re-establishment of side connections to a pipe which has been lined by a lining process as described in either of our U.S. Pat. Nos. 4,009,063 and 4,064,211.

Generally speaking, in the said U.S. patents, an underground pipeline or passageway is lined by means of a flexible lining comprising a resin absorbent material, which is soaked in curable resin, and the lining whilst still flexible, is shaped to the passage interior, and is allowed to cure to form a hard lining, thereby to complete an effective lining operation.

As can be appreciated, in lining a pipeline in the above fashion, the lining material will extend over pipe apertures forming side or branch connections, and these must be re-established in order that the pipeline can function as it did prior to the lining operation. As can also be appreciated, the re-establishment of the side connections will entail cutting out or cutting away the protion of the lining which covers each side connection, and as the pipelines which are lined by the process in either of the above U.S. patents are invariably located underground, the matter of re-establishing the side connections is one of substantial difficulty.

Currently, an equipment is used for the re-establishment of said connections, which equipment is designed to cut away the portion of the lining covering each side connection to be re-established, such device comprising a unit which is for movement along the inside of the passageway, such unit having a T.V. camera which is controllable from ground level by a control means whereby the angle of viewing of the camera may be adjusted, enabling the camera to view each side connection location, and the region viewed by the camera is of course displayed at ground level on suitable display means, for example a T.V. monitor.

The unit also has a cutter which can be manipulated from ground level, and the operator controlling the re-establishment of the side connection process, simply manipulates the cutter by viewing the display means, thereby to re-establish the side connection. Whilst this procedure operates satisfactorily, it does have a number of problems, the first being that the process is extremely slow and depends upon the efficiency of the operator who has to judge (by viewing the T.V. screen) the cutting operation. Because it is quite possible that there will be liquid deposit of resin and/or water behind each portion of the lining covering a side connection, when the first penetrating cut is made in that portion of the lining, there frequently will be a discharge of said deposit into the pipeline or passageway, which can obscure the T.V. camera, making further cutting work extremely difficult. Also, it is difficult for the operator to judge whether or not he has cut away sufficient of the lining material to restore the side connection to the size it was before the lining operation.

The present invention seeks to provide a method of re-establishing side connections to a pipeline or passageway, especially one which is located underground, whereby the difficulties encountered in the known method will be obviated or mitigated.

In accordance with the present invention, a method of re-establishing side connections to a pipeline or passageway which has been lined with a lining which covers the side connections, comprises the utilisation of a cutter which moves in a controlled fashion by the following of a predetermined path corresponding to the shape of cut to be made in the lining.

The predetermined path may be defined by means of a template or profile which is either followed manually by means of a stylus, or automatically by means of computing central equipment.

The presetting of the contour may be achieved by pre-programming the computing control equipment, and the pre-programming may be by making an assumption as to the type and size of side connection to be cut, as it is shown in particular that all side connections, or nearly all side connections are of a particular type or types. Alternatively, the programming of the computing equipment may be by plotting the shape of the side connection aperture prior to the lining of same by utilising a camera and cutter unit in the passageway, and by positioning the cutter in a particular fashion in relation to the side connection aperture, and recording the various positions of the cutter, thereby to pre-programme the computing apparatus in accordance with the side connection contour.

The computing apparatus may cause the cutter in the eventual cutting operation to follow the contour automatically, or may cause a profile to be displayed on a cathode ray tube, which profile is traced by an operator using a manual stylus, the movement of the stylus being duplicated by the movement of the cutter during the cutting operation.

The invention also extends to apparatus capable of performing the method.

By way of exemplification, reference is now made to the accompanying drawings, wherein.

Figure 5:
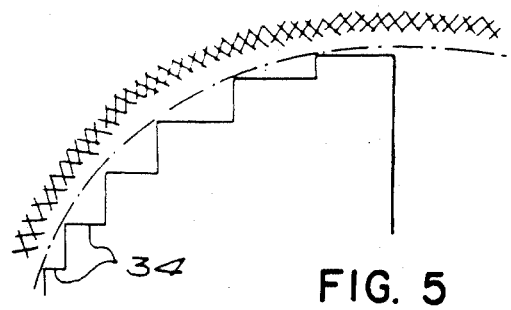
Figure 6:
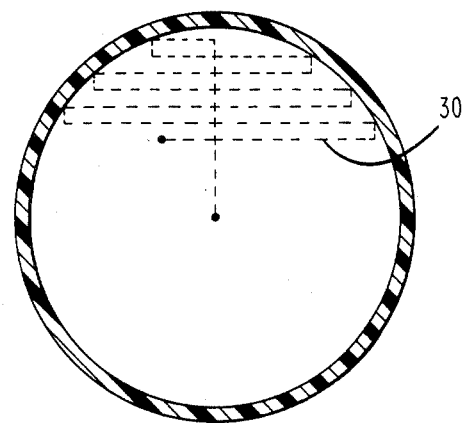
Figure 7:
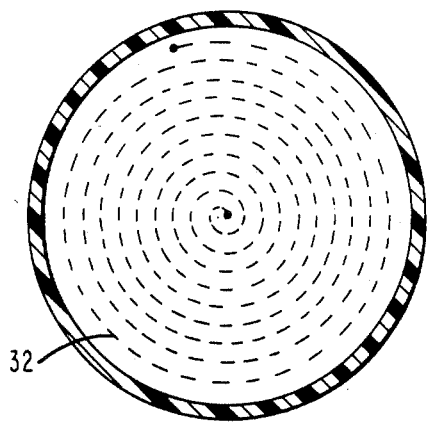

FIGS. 5, 6 and 7 respectively illustrate three modes in which the cutter can move in re-establishing the side connection.

Figure 1:
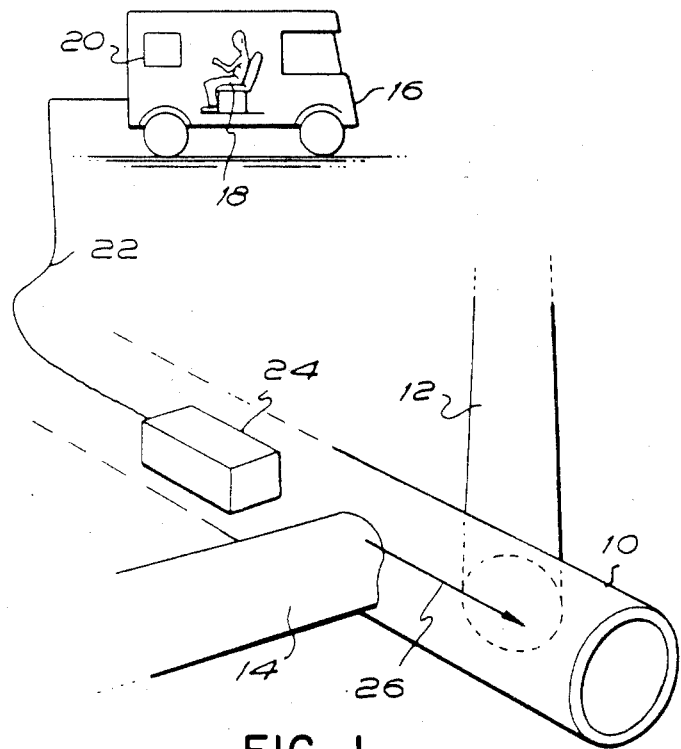
FIG. 1 illustrates in perspective view a section of underground pipeline or passageway to be lined, and having side connections to be re-established after the lining operation.

Referring to the drawings, in FIG. 1 there is shown a pipeline 10 which is located underground, and which is required to be lined with a flexible, resin impregnated lining in the manner as described in U.S. Pat. No. 4,009,063 or 4,064,211 to rehabilitate the pipe, which may be in a state of disrepair, or to change the use of the pipe. The pipe may for example be a sewer pipe, and is shown as having side connections 12, 14. FIG. 1 also shows that there is located at ground level a control vehicle 16 in which an operator sits. The vehicle is provided with a television monitor 20, for the inspection of the pipe as will be explained, and a control line 22 extends from the vehicle 16 to a camera and cutting unit 24 located in the pipe 10. This unit is in use pulled or propelled through the pipe 10, for example as indicated by the arrow 26.

Figure 3:
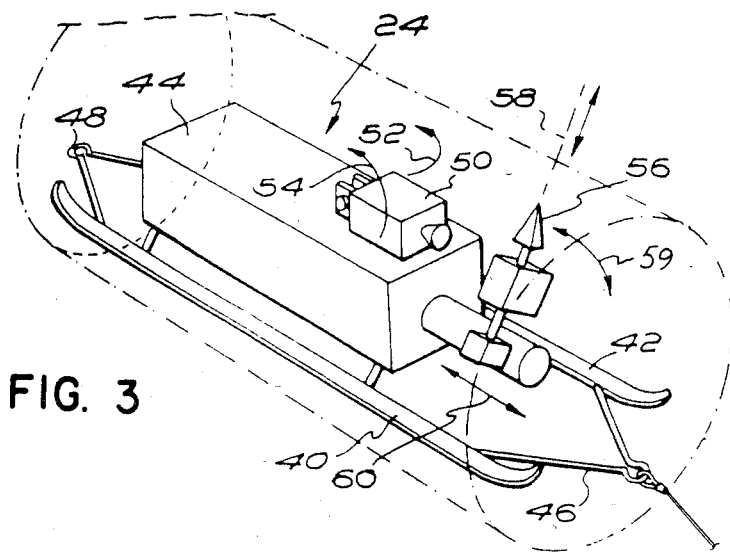
FIG. 3 illustrates a cutter and camera unit usable in accordance with the invention.

FIG. 3 illustrates diagrammatically a form of cutter and camera unit 24, which can be used in the process of the invention.

The unit is provided with a pair of skids 40, 42 which support a chassis 44 having the appropriate drive motors (not shown) and a pull shackle 46 is located at one end of the unit and is mounted on the skids 42, whilst a similar shackle 48 is provided on the unit and mounted at the other end of the skids 40, 42. A T.V. camera 50 is mounted on chassis 44 and is for viewing the interior of the pipe 10 before and after the lining is inserted, and this camera can pivot about two orthogonal axes, as shown by arrows 52 and 54, whereby any location of the pipe or lining can be viewed by the camera.

At one end of the chassis 44 is provided a cutter 56 which can be driven about the axis 58 to effect the cutting operation. Additionally, the cutter unit 56 can be pivoted about the axis of the pipe 10 or an axis parallel thereto as shown by arrow 59, and to give the cutter universal movement, the cutter can be moved axially of the pipe as indicated by arrow 60.

The various drives for the cutter and camera are mounted in the chassis 44 and therefore are not shown. These drives are controlled from a control unit in the control vehicle 16 either on selection by the operator 18, or automatically in re-establishing a side connection in accordance with the present invention.

Figure 2:
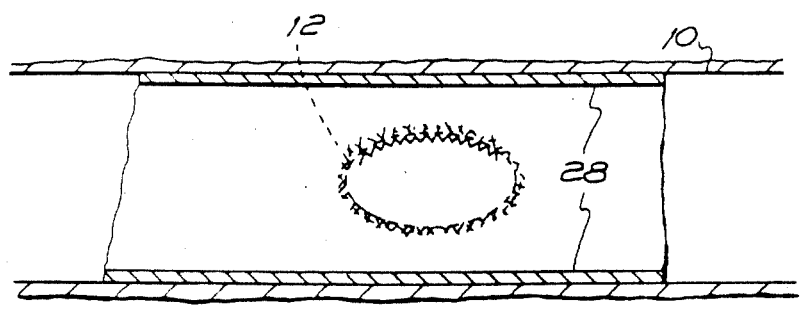
FIG. 2 shows a length of the lined pipeline in section, prior to cutting out of the lateral connection.

FIG. 2 shows in cross section a portion of the pipe 10 in the region of the side connection 12, after the pipe 10 has been lined by means of a lining 28 which is of rigid, cured synthetic resin, having embedded therein a resin absorbent material such as a felt, the lining 28 extending across and covering the side connection opening. It is this side connection which must be re-established, and conventionally it is re-established by controlling a cutter when in the pipe 10, from the vehicle 16, by observing the cutting operation on the television 20 and by manipulating the cutter to reinstate the side connection. This process can be difficult and time consuming if the camera lens becomes obscured by discharge of fluid into the pipe upon first penetration of the cutter 56 through the lining material 28 covering side connection 12. The present invention is concerned with a means for more effectively and positively re-establishing a side connection.

Figure 4:
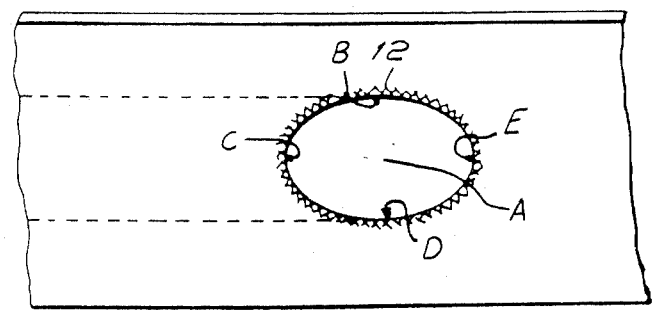
FIG. 4 illustrates the length of pipeline shown in FIG. 2, prior to lining.

Prior to the placement of the lining 28, the camera and cutter unit 24 is drawn through the pipe 10 so as to survey the same and ascertain the position of the side connections, such as 12 and 14, along the length of the pipe. In accordance with one embodiment of the invention, the cutter is zeroed in on the approximate centre of the side connection as indicated in FIG. 4 by reference A. The operator then marks out the quadrants of the side connection as shown at points B, C, D and E, the control mechanism storing each position in digital form in its memory. The motors which are used to drive the cutter and camera are stepping motors, and the stepping motors respond accurately to the positions A,B,C,D and E in digital form. The operator can repeat the process 3 or 4 times, and the computing equipment will average the readings and commit the average result in digital form to memory. On subsequent instructions to cut, after the lining operation, the cutter removes the memorised shape on instructions from the pre-programmed control equipment. Cutting may proceed by the cutter entering at the centre point of the portion of lining to be cut out, and then it can proceed for example, in the fashion shown in FIG. 5, FIG. 6, or FIG. 7. In FIG. 5, the cutter moves radially outwards and then traces the side connection contour step fashion as shown by reference 34. In FIG. 6, the cutter mooes radially outwards and then sweeps horizontally, stepping down after each pass as shown in FIG. 6 by reference 30. In FIG. 7, the cutter moves from the centre spirally as shown by reference 32. The details of the information stored in the memory can be displayed for example on a cathode ray tube so that the progress of the cutter can be observed.

It is of considerable advantage to use stepping motors for controlling the cutter in this fashion, because they are readily controlled and also can easily be arranged to respond to and to give digital readings of positions.

Instead of adopting a procedure whereby the cutter is pre-positioned to each side connection, it may be possible to pre-programme the control equipment in accordance with certain standard shapes and sizes as applied to side connections, e.g. 4", 6" and 8" side connections meeting the pipe at right angles, or at some other inclination, and by programming the cutter to operate in accordance with one of the pre-programmed arrangements. In another arrangement, the cutter can be made to follow a template. The template may be in hardware form or it may be a contour displayed on a cathode ray tube. In one arrangement, the operator may move a stylus along the contour line displayed or the outer edge of the template when in hardware form, whereby the cutter follows the movement faithfully and thereby effects the cutting operation to re-establish side connections.

FIG. 4 also shows how the side connection will look after cutting, and it will be seen that the aperture has been accurately recreated, enabling the discharge of the liquid from the side connection into the main pipe.

The present invention provides an effective means for quickly and efficiently re-establishing side connections in a pipeline or passageway which has been lined with a rigid lining tube, for example as in accordance with the method set out in U.S. Pat. No. 4,009,063 or 4,064,211.

I claim:

1. A method of re-establishing a side connection in a pipeline or passageway which has been lined with a lining which covers the side connection, the method comprising the steps of
    (a) introducing a cutter unit into the interior of the pipeline or passageway prior to the lining operation and moving it along the interior of said pipeline or passageway until it arraives at said side connection,
    (b) recording the position of the cutter unit in a computer,
    (c) withdrawing the cutter unit from the pipeline or passageway,
    (d) lining the pipeline or passageway with a lining which covers the side connection,
    (e) reintroducing said cutter unit into the interior of said pipeline or passageway,
    (f) moving said cutter unit along said pipeline or passageway,
    (g) stopping the movement of said cutter unit when it arrives at said side connection in accordance with the information derived from step (b), and
    (h) activating a cutter device on said cutter unit so that the cutter device will cut through said lining and establish an opening therethrough to said side connection.

2. A method according to claim 1 wherein the cutter unit moves to a series of side connections in step (a) which are sequentially recorded in accordance with step (b) and steps (g) and (h) are sequentially performed at said series of side connections.

* * * * *